Patented Sept. 15, 1931

1,823,359

UNITED STATES PATENT OFFICE

HARRY LE B. GRAY, OF ROCHESTER, NEW YORK, ASSIGNOR TO EASTMAN KODAK COMPANY, OF ROCHESTER, NEW YORK, A CORPORATION OF NEW YORK

PROCESS OF MAKING CELLULOSE ACETATE

No Drawing.    Application filed December 17, 1927.  Serial No. 240,943.

This invention relates to processes of making cellulose acetate. One object of the invention is to provide a process in which the consumption of glacial acetic acid is reduced and a more readily recoverable solvent is substituted. Another object is to provide a process which will produce the cellulose acetate in an especially porous solid form, having a large ratio of surface to mass which adapts it for subsequent fluid treatments. Other objects will hereinafter appear.

It is highly desirable to economize in the amounts of glacial acetic acid used in the manufacture of cellulose acetate, because said acid becomes diluted and the reconcentration of it involves either considerable trouble or expense. It is also highly desirable to obtain the cellulose acetate in a solid form which is highly porous, in contradistinction to horny impenetrable lumps.

I have found that both of these results can be obtained in the same process by cutting down the amount of glacial acetic acid in the acetylation bath to such a point that it is insufficient, by itself, to dissolve the cellulose acetate that is produced, and to include with this small amount of glacial acetic acid a volatile organic liquid which cooperates with said acid to complete the solution of the cellulose acetate, the final reaction mixture or dope being treated with a hot precipitating bath at a temperature above the boiling point of said volatile liquid. The volatile organic liquid, besides acting as an auxiliary to the acetic acid, should be inert toward acetic anhydrid, and it is preferable that it be immiscible with water to facilitate its recovery for use again. It is, of course, obvious that the liquid should not be one which breaks up into harmful products during the reaction.

I have found that ethylene dichlorid fulfills all of the requirements of a volatile organic liquid for the purpose indicated above. It has a boiling point between 83° and 84° C.; it is soluble in water to less than 1%, and it acts as an excellent solvent of cellulose acetate in conjunction with the acetic acid that is present. While it is not, by itself, a solvent of the cellulose acetate that is produced, it cooperates with the acetic acid to effect a flowable dope. It is also remarkably stable and is not broken up by acetic anhydrid or the other reaction ingredients. In other words, it does not split off hydrochloric acid, as some organic chlorids are prone to do.

While it is the best volatile organic liquid which I have found, it is, nevertheless, possible to use others, such for example as trichlorethylene and even chloroform, although the latter does not have as high a stability as the others.

I shall now give one way of carrying out my invention, for purposes of illustration, but it will be understood that the invention is not limited to the details thus set forth, except as indicated in the appended claims. 50 parts by weight of cellulosic material, say purified and bleached cotton fibers, for instance, are treated for 3½ hours at a temperature between 20° C. and 40° C. with 300 parts by weight of glacial acetic acid containing a mixed catalyst, the latter being composed of .9 parts by weight of sulfuric acid and 2.7 parts by weight of ortho phosphoric acid. At the end of this pretreatment the excess of liquid is removed, in a press or centrifuge so that the ratio of acetic acid to the cellulosic material is approximately one to one. This amount of acetic acid is insufficient to dissolve the cellulose acetate which is produced in the following operations, it being remembered that a flowable dope should be obtained.

Into the mixture of cellulosic material, residual catalyst, and acetic acid there is then added a mixture of 124 parts by weight of actual acetic anhydrid and between 200 and 300 parts by weight of ethylene chlorid. The mixing should uniformly distribute the ingredients throughout the reaction mass as soon as possible. The tendency to a rapid rise in temperature should be restrained, say by cooling the reaction vessel. It is best to keep the reaction mass between 33° C. and 55° C. preferably with agitation, until a clear, flowable dope is obtained.

This reaction mixture containing the cellulose acetate which is produced, dissolved in acetic acid and ethylene chlorid, is then treated in a precipitating bath at a temperature at or above the boiling point of ethylene chlorid. I have found that a water bath close to its own boiling point, namely, 100° C., is an excellent one into which to introduce and agitate the reaction mixture. As the streams of the reaction mass enter the heated water, the ethylene chlorid, almost instantly evaporates or flashes and is withdrawn from the top of the bath and condensed. The acetic acid is dissolved in the water, and the cellulose acetate is precipitated. Because of this flashing into vapor of the ethylene chlorid at the instant that the cellulose acetate is precipitated, the latter is produced in a remarkably porous or flocculent form, which presents a very great surface relative to its mass, after being washed and dried. The ethylene chlorid which is condensed, is allowed to separate from any water condensed with it, and is then drawn off for reuse. The acetic acid is recovered in the usual way, but on acocunt of the smaller amount of it, notable economies can be obtained.

While in the above example I have described a particular way of pretreating the cellulosic material before acetylation, it will be understood that any of the other known equivalent ways of pretreating the cellulose may be employed, or pretreatment may be eliminated entirely and an acetylation made with the major part of the normal quantities of acetic acid replaced with ethylene chlorid, or an equivalent stable volatile organic liquid.

Having thus described my invention, what I claim as new and desire to secure by Letters Patent is:

1. In the process of making cellulose acetate, treating cellulosic material with acetic anhydrid and a catalyst in the presence of a mixture which dissolves the cellulose acetate produced, said mixture comprising an amount of acetic acid insufficient, by itself, to dissolve said cellulose acetate and a volatile, organic liquid, substantially immiscible with water and inert toward acetic anhydrid, which cooperates with said acetic acid to complete said solution, the final reaction mixture containing dissolved cellulose acetate being treated in an aqueous precipitating bath which has a temperature above the boiling point of said volatile liquid.

2. In the process of making cellulose acetate, treating cellulosic material with acetic anhydrid and a catalyst in the presence of a mixture which dissolves the cellulose acetate produced, said mixture comprising ethylene dichlorid and an amount of acetic acid insufficient by itself to dissolve said cellulose acetate, the final reaction mixture containing dissolved cellulose acetate being precipitated by flowing into a hot aqueous bath at a temperature above the boiling point of ethylene chlorid.

3. The process which comprises introducing a solution of cellulose acetate into a precipitating liquid which has a boiling point higher than at least one of the components of the cellulose acetate solute and which precipitating liquid is maintained at a temperature higher than the boiling point of the said solute component.

4. The process of precipitating cellulose acetate from solution in a solvent having a boiling point less than 100° C. which comprises introducing the said solution into water which is maintained at a temperature higher than the boiling point of said solvent.

5. The process of precipitating cellulose acetate from solution in a solvent containing ethylene dichlorid which comprises introducing the said solution into water which is maintained at a temperature higher than the boiling point of said solvent.

6. In the acetylation of fibrous cellulose material, the process which comprises acetylating the fiber in the presence of ethylene dichlorid.

7. In the acetylation of cellulose material, the process which comprises acetylating cellulose material in the presence of ethylene dichlorid.

8. In the acetylation of cellulose, the process which comprises acetylating cellulose in the presence of ethylene dichlorid.

9. In the acetylation of cellulose material, the process which comprises acetylating cellulose material in the presence of a solvent for the acetylated cellulose material, which solvent comprises ethylene dichlorid.

10. In the acetylation of cellulose, the process which comprises acetylating cellulose in the presence of a solvent for the acetylated cellulose, which solvent comprises ethylene dichlorid.

Signed at Rochester, New York, this 13th day of December, 1927.

HARRY LE B. GRAY.